United States Patent
Lee et al.

(10) Patent No.: US 9,381,938 B2
(45) Date of Patent: Jul. 5, 2016

(54) MOTOR DRIVEN POWER STEERING TUNABLE BY USER

(75) Inventors: Kyungbok Lee, Seoul (KR); Namyoung Kim, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 704 days.

(21) Appl. No.: 13/528,014

(22) Filed: Jun. 20, 2012

(65) Prior Publication Data

US 2013/0151076 A1     Jun. 13, 2013

(30) Foreign Application Priority Data

Dec. 13, 2011    (KR) ........................ 10-2011-0133542

(51) Int. Cl.
| | |
|---|---|
| *B62D 6/02* | (2006.01) |
| *B62D 6/00* | (2006.01) |
| *B62D 5/04* | (2006.01) |
| *G01L 5/22* | (2006.01) |

(52) U.S. Cl.
CPC .............. *B62D 6/007* (2013.01); *B62D 5/0463* (2013.01); *G01L 5/221* (2013.01)

(58) Field of Classification Search
CPC ............................ B62D 5/0463; G01L 5/221
USPC ........................................... 701/41; 180/446
See application file for complete search history.

(56) References Cited

U.S. PATENT DOCUMENTS

| | | | | |
|---|---|---|---|---|
| 4,702,335 A | * | 10/1987 | Cage et al. ..................... | 180/423 |
| 6,116,372 A | * | 9/2000 | Mukai et al. ................... | 180/446 |
| 6,152,255 A | * | 11/2000 | Noro ..................... | B62D 6/007 180/443 |
| 7,377,356 B2 | * | 5/2008 | Turner et al. ................... | 180/446 |
| 2002/0143449 A1 | * | 10/2002 | Yasuda ............................ | 701/41 |
| 2003/0195684 A1 | * | 10/2003 | Martens ......................... | 701/41 |
| 2012/0055731 A1 | * | 3/2012 | Lee ......................... | B62D 6/007 180/446 |
| 2012/0203430 A1 | * | 8/2012 | Shimada et al. ................ | 701/41 |

FOREIGN PATENT DOCUMENTS

| | | |
|---|---|---|
| JP | 3-200475 A | 9/1991 |
| JP | 5-170113 A | 7/1993 |
| JP | 2001-253219 A | 9/2001 |
| JP | 2003-212143 A | 7/2003 |
| JP | 2010-70068 A | 4/2010 |
| KR | 10-2009-0027012 A | 3/2009 |
| KR | 20110001529 A | 1/2011 |
| KR | 20110070738 A | 6/2011 |
| WO | WO 03/084799 A1 | 10/2003 |

* cited by examiner

*Primary Examiner* — Thomas G Black
*Assistant Examiner* — Peter D Nolan
(74) *Attorney, Agent, or Firm* — Morgan, Lewis & Bockius LLP

(57) ABSTRACT

The motor-driven power steering may include a user selection unit, a driving motor unit, and a control unit that includes a basic current map creating driving torque according to a vehicle speed for controlling the driving motor unit by using a vehicle speed and steering torque input through CAN communication and a sub-current map obtained by reducing the basic current map at a predetermined reduction ratio, creates adjustment torque corresponding to an adjustment signal adjusted by the user selection unit by using the sub-current map, and includes a sub-functional logic adjusting driving torque created by the basic current map by the created adjustment torque, a driving torque compensation map compensating adjustment driving torque adjusted by the sub-functional logic in accordance with the traveling state of a vehicle, and a driving logic that controls the driving motor unit by using compensation driving torque compensated by the driving torque compensation map.

6 Claims, 3 Drawing Sheets

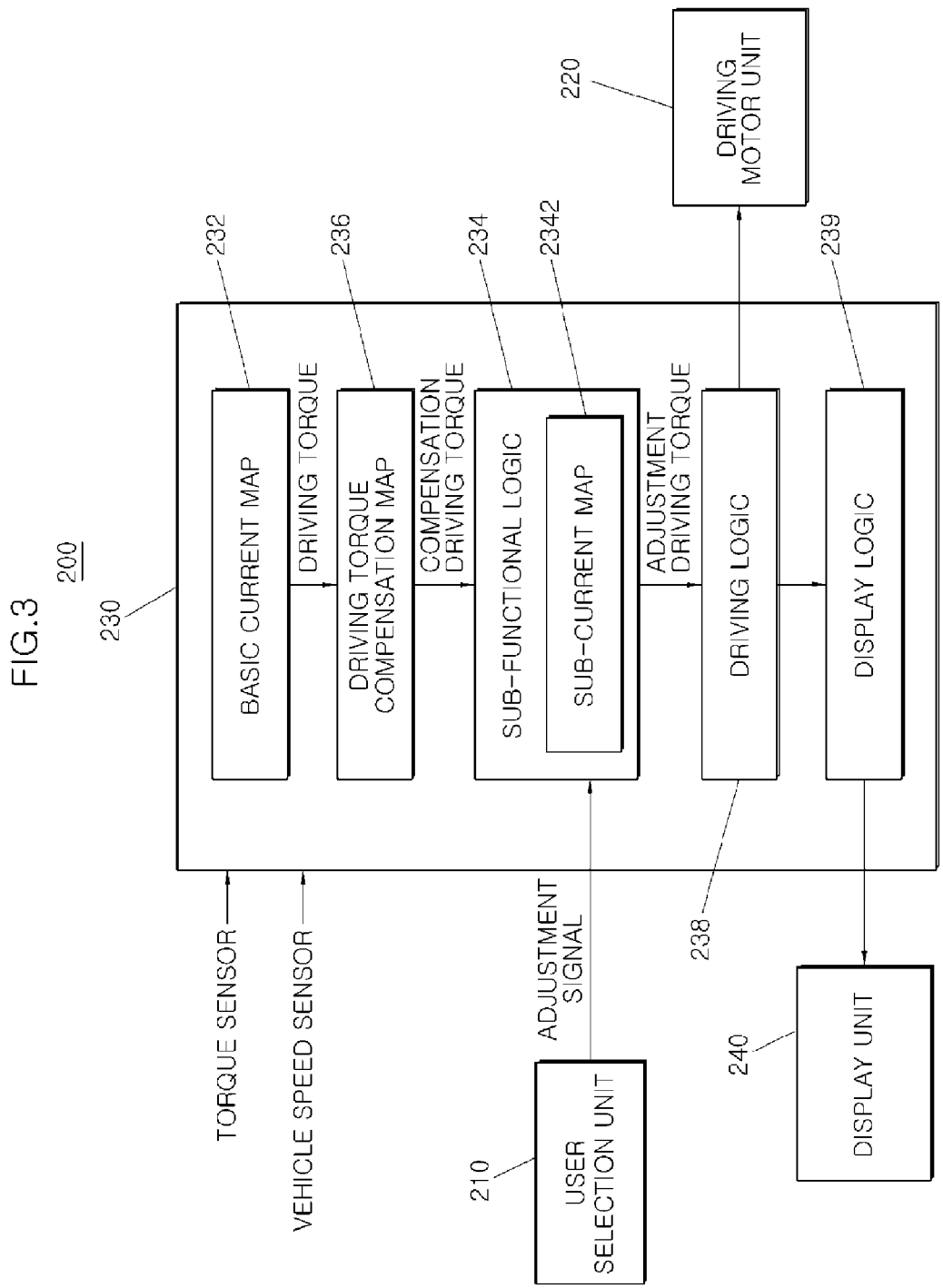

MOTOR DRIVEN POWER STEERING TUNABLE BY USER

CROSS-REFERENCE TO RELATED APPLICATIONS

The present application claims priority to Korean Patent Application Number 10-2011-133542 filed Dec. 13, 2011, the entire contents of which application is incorporated herein for all purposes by this reference.

BACKGROUND OF THE INVENTION

1. Field of the Invention

The present invention relates to a motor-driven power steering, and particularly, to a power steering system equipped with a user interface that can be tuned by a user.

2. Description of Related Art

A motor-driven power steering (MDPS) is a device that assists a steering force of a steering wheel by an electric motor. Recently, the motor-driven power steering is provided with a sub-functional logic that can be tuned by a driver to improve convenience of the driver in accordance with the traveling situation, in addition to a basic logic for changing the steering force in accordance with the speed.

The basic principle of the sub-functional logic of the related art is to increase/decrease the amount of motor current calculated from the basic logic in response to tuning of the driver.

However, the sub-functional logic of the related art uses a uniform method of simply adding or subtracting a predetermined magnitude of current value that is determined by tuning of a user to or from the amount of motor current obtained from the basic logic. Therefore, the sub-functional logic of the related art cannot appropriately reflect the calculation basis of the basic logic, which may decreases a steering force from the drive.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a motor-driven power steering equipped with a user interface that can adjust a steering force in accordance with selection of a user without damaging the calculation basis of the amount of sub-torque created by the basic logic.

In an aspect of the present invention, a motor-driven power steering apparatus, may include a user selection unit transmitting an adjustment signal for adjusting a steering force of a steering wheel, a driving motor unit for driving a rack in accordance with the operation of the steering wheel, and a control unit receiving the adjustment signal from the user selection unit and actuating the driving motor unit, wherein the control unit may include a basic current map creating a driving torque according to a vehicle speed for controlling the driving motor unit by using the vehicle speed and a steering torque input through CAN communication of a vehicle, a sub-current map obtained by reducing the basic current map at a predetermined reduction ratio and creating an adjustment torque corresponding to the adjustment signal adjusted by the user selection unit by using the sub-current map, a sub-functional logic adjusting the driving torque created by the basic current map by the adjustment torque created by the sub-current map, a driving torque compensation map compensating an adjustment driving torque adjusted by the sub-functional logic in accordance with a traveling state of the vehicle, and a driving logic that controls the driving motor unit by using a compensation driving torque compensated by the driving torque compensation map.

In another aspect of the present invention, a motor-driven power steering apparatus, may include a user selection unit transmitting an adjustment signal for adjusting a steering force of a steering wheel, a driving motor unit for driving a rack in accordance with the operation of the steering wheel, and a control unit receiving the adjustment signal from the user selection unit and actuating the driving motor unit, wherein the control unit may include a basic current map creating a driving torque according to a vehicle speed for controlling the driving motor unit by using the vehicle speed and a steering torque input through CAN communication of a vehicle, a driving torque compensation map compensating the driving torque created by the basic current map in accordance with a traveling state of the vehicle, a sub-current map obtained by reducing the basic current map at a predetermined reduction ratio and creating an adjustment torque corresponding to the adjustment signal adjusted by the user selection unit by using the sub-current map, a sub-functional logic adjusting a compensation driving torque compensated by the driving torque compensation map, and a driving logic controlling the driving motor unit by using an adjustment driving torque adjusted by the sub-functional logic.

In the sub-functional logic, the sub-current map creates a reduction driving torque reduced as much as the predetermined reduction ratio in comparison to the driving torque created by the basic current map in accordance with the input steering toque and the vehicle speed, and the adjustment torque is created by an adjusting unit that adjusts the reduction driving torque in response to the adjustment signal.

The adjusting unit amplifies the reduction driving torque at a predetermined ratio in response to the adjustment signal.

The user selection unit is implemented by a multi-step switch for changing the magnitude of a current by stages to adjust the driving torque by the control unit.

The motor-driven power steering apparatus may further include a display unit for displaying a change in steering force of the steering wheel which corresponds to adjustment of the user selection unit, wherein the control unit may further include a display logic that determines the steering force of the steering wheel which is changed by the adjustment signal of the user selection unit and controls the display unit such that an image corresponding to the determined steering force of the steering wheel is displayed.

Therefore, the present invention can improve driving convenience of a driver by adjusting a steering force according to selection of a user without damaging a calculation basis of the amount of sub-torque created by the basic logic for driving the driving motor unit by the sub-functional logic including the sub-current map.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3 is a block diagram showing a motor-driven power steering according to various exemplary embodiments of the present invention.

Figure 1:
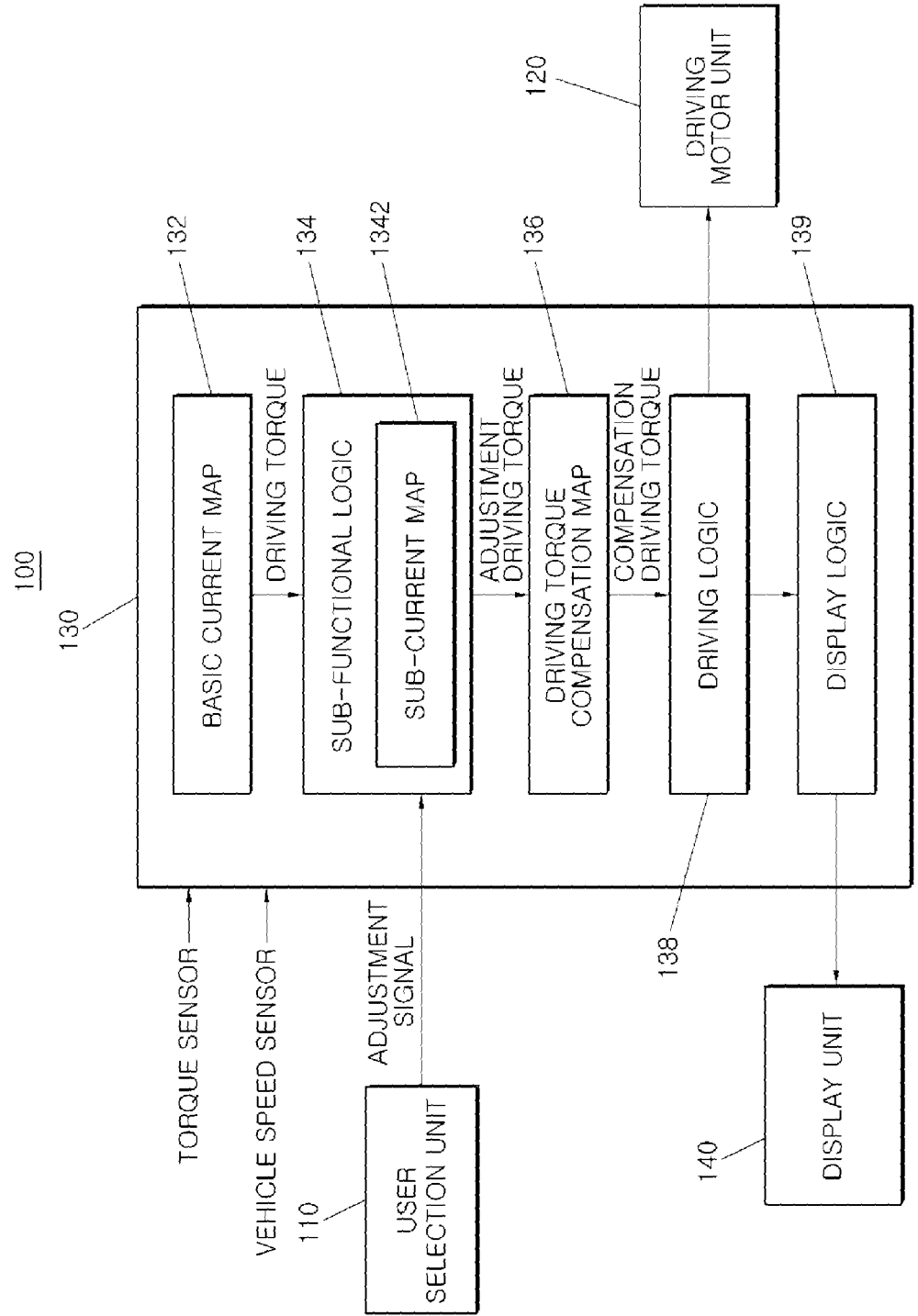
FIG. 1 is a block diagram showing a motor-driven power steering according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a motor-driven power steering according to exemplary embodiments of the present invention will be described with reference to the accompanying drawings.

FIG. 1 is a block diagram showing a motor-driven power steering according to a first exemplary embodiment of the present invention. As shown in FIG. 1, a motor-driven power steering (MDPS) 100 according to the exemplary embodiment includes a user selection unit 110, a driving motor unit 120, and a control unit 130, and is a steering system that assists the steering force of a steering wheel and can optimize a steering force from a driver by compensating torque.

User selection unit 110 is a user interface for a user to adjust the steering force of a steering wheel, may be implemented by a multi-step switch for changing the magnitude of a current by stages to adjust driving torque, and creates and transmits an adjustment signal corresponding to the adjustment by the user to control unit 130.

Driving motor unit 120 is driven by control unit 130 and drives the wheels of a vehicle by driving a rack in response to the operation of the steering wheel.

Control unit 130, as shown in FIG. 1, may be divided into a basic current map 132, a sub-functional logic 134, and a driving torque compensation map 136 and controls the generation operation of motor-driven power steering 100 according to the exemplary embodiment. The functional division is for the convenience of description and control unit 130 according to the exemplary embodiment is not limited to only the divided modules.

Basic current map 132 may be set in advance to create driving torque according to the vehicle speed in order to control driving motor unit 120 operating with the rack by using the vehicle speed and steering torque input through CAN communication of the vehicle.

Sub-functional logic 134 includes a sub-current map 1342 obtained by reducing basic current map 132 at a predetermined reduction ratio and creates adjustment torque corresponding to an adjustment signal adjusted by user selection unit 110 by using sub-current map 1342. Sub-functional logic 134 can adjust the driving torque created by the basic current map by using the created adjustment torque. The adjusted adjustment torque is processed by driving torque compensation map 136.

Creating adjustment torque by sub-functional logic 134 is described in detail with reference to FIG. 2. The created adjustment torque is used to adjust the driving torque created by basic current map 132.

Figure 2:
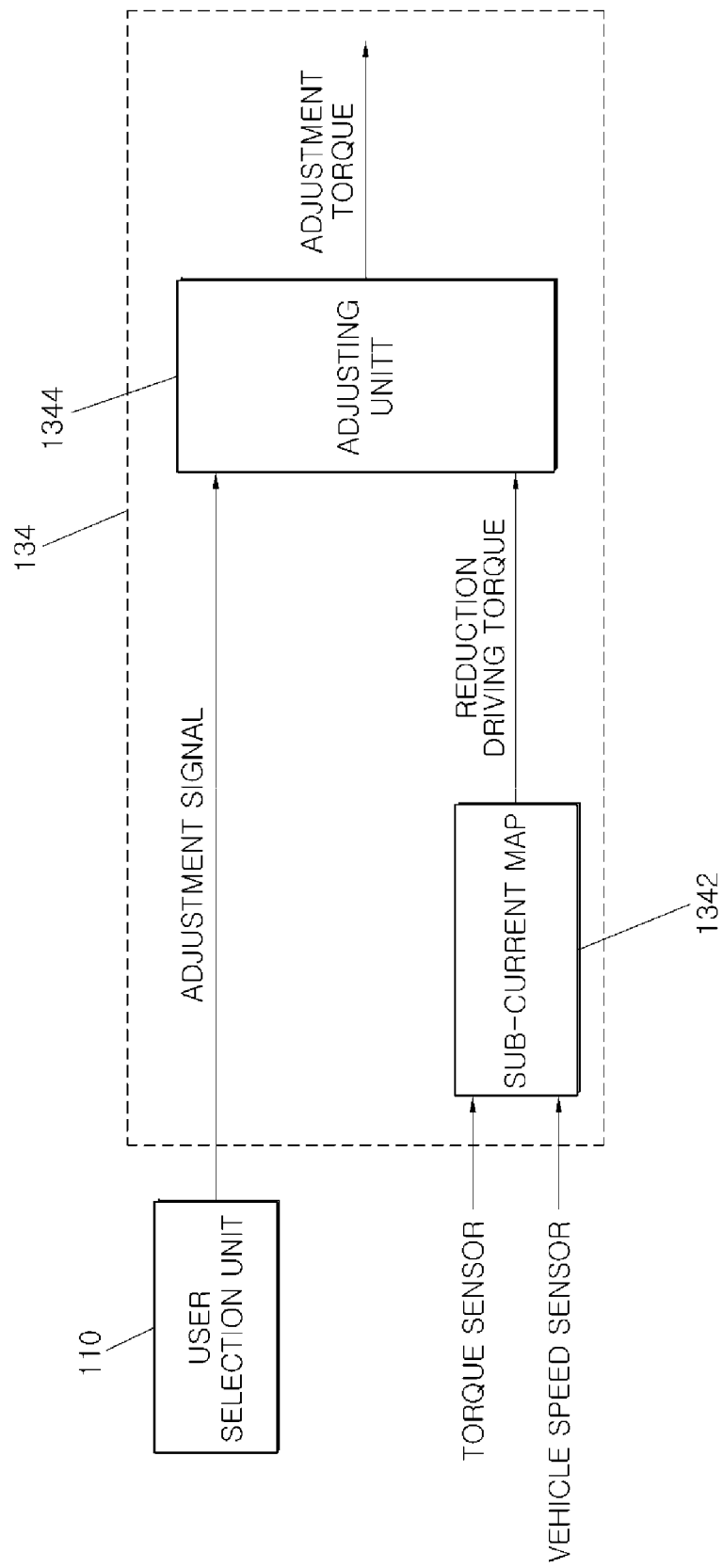
FIG. 2 is a block diagram illustrating a process of creating adjustment torque by sub-functional logic according to the various exemplary embodiments of the present invention.

As shown in FIG. 2, sub-current map 1342 is a map obtained by reducing the size of basic current map 132 at a predetermined ratio and creates driving torque reduced as much as the reduction ratio in comparison to the driving torque created by basic current map 132.

The adjustment torque used for adjusting the driving torque created by the basic current map is created by an adjusting unit 1344 that adjusts the reduction driving torque reduced by sub-current map 1342 in response to an adjustment signal transmitted from user selection unit 110. In general, adjusting unit 1344 may be implemented to amplify the reduction driving torque at a predetermined ratio in response to the adjustment signal.

Driving torque compensation map 136 compensates adjustment driving torque adjusted by sub-functional logic 134 in accordance with the traveling state of the vehicle. Driving torque compensation map 136 may usually include various compensation logics, such as damping compensation, restoration control, inertia compensation, and friction compensation.

A driving logic 138 can control driving motor unit 120 by the compensation driving torque compensated by driving torque compensation map 136.

A display logic 139 calculates a steering force of the steering wheel, which corresponds to compensation driving torque changed by the adjustment signal of user selection unit 110 and control display unit 140 such that an image corresponding to the calculated steering force of the steering wheel is displayed. The image may be implemented by a graph showing the change state of the steering force of the steering wheel.

A motor-driven power steering 200 according to a second exemplary embodiment of the present invention is described hereafter with reference to FIG. 3. Motor-driven power steering 200 according to the exemplary embodiment, similar to the first exemplary embodiment, includes a user selection unit 210, a driving motor unit 220, and a control unit 230, and is different from the first exemplary embodiment in the operation of control unit 230.

Therefore, the operation of control unit 230 will be mainly described and the description of other configurations is omitted.

Control unit 230 according to the second exemplary embodiment may be divided into a basic current map 232, a driving torque compensation map 236, a sub-functional logic 234, and a driving logic 238.

Basic current map 132, similar to the first exemplary embodiment, creates driving torque according to the vehicle speed in order to control driving motor unit 220 operating with the rack by using the vehicle speed and steering torque input through CAN communication of the vehicle Driving torque compensation map 236 compensates first driving torque created by basic current map 232, different from the first exemplary embodiment.

Sub-functional logic 234 is the same as the first exemplary embodiment shown in FIG. 2 in including a sub-current map 2342 and a process of creating adjustment torque, but different from the first exemplary embodiment, a sub-current map 2342 according to the second exemplary embodiment adjusts compensation driving torque compensated by driving torque compensation map 236. Driving logic 238 can control driving motor unit 220 by using the adjustment driving torque adjusted as described above.

A display logic 239 calculates a steering force of the steering wheel, which corresponds to adjustment driving torque changed by the adjustment signal of user selection unit 110 and control display unit 240 such that an image corresponding to the calculated steering force of the steering wheel is displayed. The image may be implemented by a graph showing the change state of the steering force of the steering wheel.

As described above, motor-driven power steerings 100 and 200 according to the exemplary embodiments can adjust a steering force according to selection of a user without damaging a calculation basis of the amount of sub-torque created by the basic logic for driving driving motor units 120 and 220 by sub-functional logics 134 and 234 including sub-current maps 1342 and 2342, such that it is possible to improve driving convenience of the driver.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A motor-driven power steering apparatus, comprising:
   a user selection unit transmitting an adjustment signal for adjusting a steering force of a steering wheel;
   a driving motor unit for driving a rack in accordance with the operation of the steering wheel; and
   a control unit receiving the adjustment signal from the user selection unit and actuating the driving motor unit,
   wherein the control unit includes:
   a basic current map calculating a driving torque according to a vehicle speed for controlling the driving motor unit by using the vehicle speed and a steering torque input through CAN communication of a vehicle;
   a sub-current map obtained by reducing the basic current map at a predetermined reduction ratio and calculating an adjustment torque corresponding to the adjustment signal adjusted by the user selection unit by using the sub-current map;
   sub-functional logic adjusting the driving torque calculated by the basic current map by the adjustment torque calculated by the sub-current map;
   a driving torque compensation map compensating an adjustment driving torque adjusted by the sub-functional logic in accordance with a traveling state of the vehicle; and
   a driving logic that controls the driving motor unit by using a compensation driving torque compensated by the driving torque compensation map,
   wherein in the sub-functional logic, the sub-current map calculates a reduction driving torque reduced as much as the predetermined reduction ratio in comparison to the driving torque calculated by the basic current map in accordance with the input steering torque and the vehicle speed, and the adjustment torque is created by an adjusting unit that adjusts the reduction driving torque in response to the adjustment signal,
   and wherein the adjusting unit amplifies the reduction driving torque at a predetermined ratio in response to the adjustment signal.

2. The motor-driven power steering apparatus, as defined in claim 1, wherein the user selection unit is implemented by a multi-step switch for changing the magnitude of a current by stages to adjust the driving torque by the control unit.

3. The motor-driven power steering apparatus, as defined in claim 1, further comprising:
   a display unit for displaying a change in steering force of the steering wheel which corresponds to adjustment of the user selection unit,
   wherein the control unit further includes a display logic that determines a steering force of the steering wheel which is changed by the adjustment signal of the user selection unit and controls the display unit such that an image corresponding to the determined steering force of the steering wheel is displayed.

4. A motor-driven power steering apparatus, comprising:
   a user selection unit transmitting an adjustment signal for adjusting a steering force of a steering wheel;
   a driving motor unit for driving a rack in accordance with the operation of the steering wheel; and
   a control unit receiving the adjustment signal from the user selection unit and actuating the driving motor unit,
   wherein the control unit includes:
   a basic current map calculating a driving torque according to a vehicle speed for controlling the driving motor unit by using the vehicle speed and a steering torque input through CAN communication of a vehicle;
   a driving torque compensation map compensating the driving torque calculated by the basic current map in accordance with a traveling state of the vehicle;
   a sub-current map obtained by reducing the basic current map at a predetermined reduction ratio and calculating an adjustment torque corresponding to the adjustment signal adjusted by the user selection unit by using the sub-current map;
   a sub-functional logic adjusting a compensation driving torque compensated by the driving torque compensation map using the adjustment torque calculated by the sub-current map; and
   a driving logic controlling the driving motor unit by using an adjustment driving torque adjusted by the sub-functional logic,
   wherein in the sub-functional logic, the sub-current map calculates a reduction driving torque reduced as much as the predetermined reduction ratio in comparison to the driving torque calculated by the basic current map in accordance with the input steering torque and the vehicle speed, and the adjustment torque is created by an adjusting unit that adjusts the reduction driving torque in response to the adjustment signal,
   and wherein the adjusting unit amplifies the reduction driving torque at a predetermined ratio in response to the adjustment signal.

5. The motor-driven power steering apparatus, as defined in claim 4, wherein the user selection unit is implemented by a multi-step switch for changing the magnitude of a current by stages to adjust the driving torque by the control unit.

6. The motor-driven power steering apparatus, as defined in claim 4, further comprising:
  a display unit for displaying a change in steering force of the steering wheel which corresponds to adjustment of the user selection unit,
  wherein the control unit further includes a display logic that determines the steering force of the steering wheel which is changed by the adjustment signal of the user selection unit and controls the display unit such that an image corresponding to the determined steering force of the steering wheel is displayed.

* * * * *